US012101431B2

(12) United States Patent
Weissler et al.

(10) Patent No.: US 12,101,431 B2
(45) Date of Patent: Sep. 24, 2024

(54) POLICY CONTROLS FOR MOBILE DEVICE MANAGEMENT SYSTEMS

(71) Applicants: Driving Management Systems, Inc., Colorado Springs, CO (US); Ardıç Ar-Ge Bilgi ve Teknoloji Çözümleri A.Ş., Istanbul (TR)

(72) Inventors: Paul Weissler, Colorado Springs, CO (US); Gordon Quinn, Colorado Springs, CO (US); Tunç Kahveci, Istanbul (TR); Haluk Tufekci, Istanbul (TR); Baris Inanç, Istanbul (TR); Ceyhun Ertürk, Istanbul (TR); Serhat Asma, Istanbul (TR)

(73) Assignees: Driving Management Systems, Inc., Colorado Springs, CO (US); Ardıç Ar-Ge Bilgi ve Teknoloji Çözümleri A.Ş., Istanbul (TR)

( * ) Notice: Subject to any disclaimer, the term of this patent is extended or adjusted under 35 U.S.C. 154(b) by 0 days.

(21) Appl. No.: 17/784,820

(22) PCT Filed: Dec. 15, 2020

(86) PCT No.: PCT/US2020/065109
§ 371 (c)(1),
(2) Date: Jun. 13, 2022

(87) PCT Pub. No.: WO2021/126846
PCT Pub. Date: Jun. 24, 2021

(65) Prior Publication Data
US 2023/0412725 A1    Dec. 21, 2023

Related U.S. Application Data

(60) Provisional application No. 62/948,439, filed on Dec. 16, 2019.

(51) Int. Cl.
*H04M 1/72463* (2021.01)
*H04M 1/72412* (2021.01)
(Continued)

(52) U.S. Cl.
CPC . *H04M 1/724634* (2022.02); *H04M 1/72412* (2021.01); *H04M 1/72454* (2021.01); *H04M 1/72457* (2021.01)

(58) Field of Classification Search
CPC .... H04L 67/34; H04L 67/52; H04M 1/72412; H04M 1/72457; H04M 1/724634; H04W 4/021
See application file for complete search history.

(56) References Cited

U.S. PATENT DOCUMENTS

| | | |
|---|---|---|
| 10,743,241 B1 | 8/2020 | McKeefery et al. |
| 2014/0082117 A1* | 3/2014 | Unhale ........... H04L 67/306 709/208 |

(Continued)

OTHER PUBLICATIONS

International Search Report and Written Opinion of the International Searching Authority for PCT/US2020/065109 dated Mar. 12, 2021, 7 pages.

*Primary Examiner* — Farid Seyedvosoghi
(74) *Attorney, Agent, or Firm* — WARNER NORCROSS + JUDD LLP

(57) ABSTRACT

A method for wireless policy enforcement of an MDM device according to the detection of a preselected state is provided. In one embodiment, the method includes providing a software application for execution by the MDM device, such that the MDM device determines whether or not the preselected state is present. If the preselected state is present, the software application is further operable to notify an MDM server, which then pushes temporary policy controls to the MDM device. The temporary policy controls overwrite existing policy controls and remove non- (Continued)

whitelisted application tiles from the MDM device home screen. Non-whitelisted application tiles can be selected by the MDM administrator and can include texting functions, social media applications, and internet browsers. The pre-selected state can include the presence or absence of motion, a minimum speed, location, date and time, proximity to a signal source, internet connectivity, Bluetooth connectivity, and combinations of the foregoing.

13 Claims, 3 Drawing Sheets

(51) Int. Cl.
*H04M 1/72454* (2021.01)
*H04M 1/72457* (2021.01)

(56) References Cited

U.S. PATENT DOCUMENTS

| | | | |
|---|---|---|---|
| 2015/0021113 A1* | 1/2015 | Lefevbre | B60K 28/00 |
| | | | 180/272 |
| 2016/0088469 A1* | 3/2016 | Racha | H04W 4/48 |
| | | | 455/418 |
| 2016/0373944 A1 | 12/2016 | Jain et al. | |
| 2017/0054760 A1* | 2/2017 | Barton | H04L 63/0823 |
| 2019/0158654 A1* | 5/2019 | Way | H04W 52/0254 |
| 2019/0182749 A1 | 6/2019 | Breaux et al. | |
| 2020/0252339 A1 | 8/2020 | McKeefery et al. | |

* cited by examiner

POLICY CONTROLS FOR MOBILE DEVICE MANAGEMENT SYSTEMS

CROSS-REFERENCE TO RELATED APPLICATIONS

This application claims the benefit of U.S. Provisional Application 62/948,439, filed Dec. 16, 2019, the disclosure of which is incorporated by reference in its entirety.

FIELD OF THE INVENTION

The present invention relates to policy controls for mobile devices enrolled in a mobile device management system, the policy controls being capable of limiting access to selected functions for preventing distracted driving and for other purposes.

BACKGROUND OF THE INVENTION

Mobile device management (MDM) systems are frequently used to simplify the management of end-user devices. MDM systems typically include a backend server or a combination of servers to monitor and manage the operation of certain functions on end-user devices, especially in corporate settings. For example, MDM systems are routinely used to manage email, calendar data, contact information, and other information specific to a corporate enterprise. MDM systems increasingly include the remote distribution of applications, data, and configuration settings via an over-the-air or wireless network.

Depending on the operating system (OS), there exists a number of methods for limiting access to selected functions on end-user devices. For mobile devices running the Android OS, for example, a third-party software application can fully control the home screen to limit access to only whitelisted applications. For end-user devices running iOS, however, this functionality is generally not available. Instead, the iOS end-user devices must typically enable Autonomous Single App Mode (ASAM). In ASAM, MDM administrators enable a single software application for one or more supervised devices. Non-native applications (and all or nearly all native applications) are disabled, and when rebooted, the supervised device continues in ASAM mode until disabled by the MDM administrator.

In some environments, it is desirable to periodically prevent access to one or more smartphone applications on MDM devices while still allowing these applications to run in the background. For example, it is widely reported that mobile device usage while driving is a significant safety concern in the U.S. In particular, social media applications, texting, push notifications, and internet browsing can divert the driver's attention from the road and add to the driver's cognitive workload. Enterprises may prefer to disable these functions on supervised devices while driving, while simultaneously permitting calls and navigation functions. While the ability to selectively disable certain applications is generally available for Android devices, no comparable solution exists for iOS devices.

Accordingly, there remains a continued need for systems and methods for selectively disabling access to certain applications for MDM devices, including but not limited to MDM devices running iOS, to limit distracted driving and for other applications.

SUMMARY OF THE INVENTION

A method and a system for wireless policy enforcement of an MDM device is provided. The method and the system generally include a software application for execution by the MDM device to detect the presence of a state based on MDM device sensory data. If the state is detected, an MDM server pushes temporary policy controls to the MDM device. The temporary policy controls overwrite existing policy controls and remove certain application tiles from the MDM device home screen. These application tiles can be selected by an MDM administrator and can include text messaging applications, social media applications, and internet browsers, for example.

In one embodiment, the system for wireless policy enforcement includes an MDM device and an MDM server. The MDM device includes a graphical user interface comprising a home screen with a plurality of application tiles. The MDM device also includes at least one sensor for detecting the presence of a state at the MDM device. The MDM server includes a temporary policy control and is adapted to receive signals indicative of the presence of the state of the MDM device. The temporary policy controls cause the MDM device to overwrite a preexisting policy control, which causes the MDM device operating system to hide at least one application tile from the home screen. The hidden application operates in the background application layer of the MDM device until the MDM device reverts to a pre-existing policy control, optionally in response to a further notification from the MDM server.

The present invention can be implemented across a wide range of environments, including driving environments, commercial enterprises, educational settings, and domestic settings. For example, a method to restrict access to certain mobile device applications while driving is provided. The method includes detecting, at the MDM device, the presence of a state based on MDM sensory data. The state can include, for example, motion of the MDM device or a minimum speed of the MDM device, indicating the MDM device is in transit. The method further includes receiving, at the MDM server, signals indicative of the presence of the state at the MDM device and pushing a temporary policy control to the MDM device. The temporary policy control overwrites a preexisting policy control to hide at least one application tile on the MDM device home screen, such that the end-user cannot circumvent MDM controls and obtain access to denied functionality while the MDM device is in transit. The detected state can also include location (including geographic location, location within a vehicle, and location relative to a geo-fenced area), date and time, proximity to a signal source, network connectivity, and combinations of the foregoing.

These and other features of the invention will be more fully understood and appreciated by reference to the description of the embodiments and the drawings.

DETAILED DESCRIPTION OF THE CURRENT EMBODIMENTS

Figure 1:
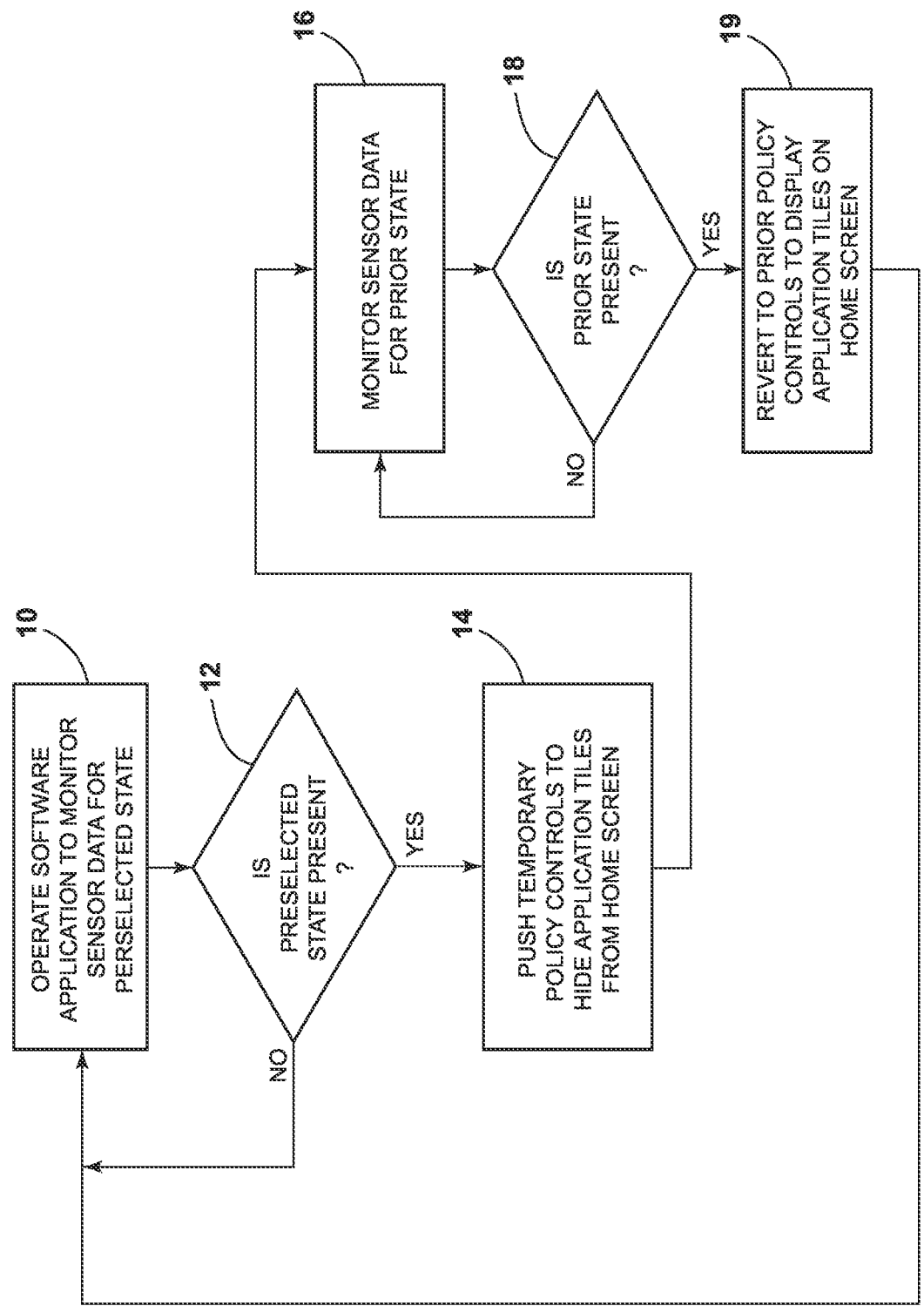
FIG. 1 is a flow chart for implementing remote policy controls for an MDM device in accordance with one embodiment of the invention.
Figure 2:
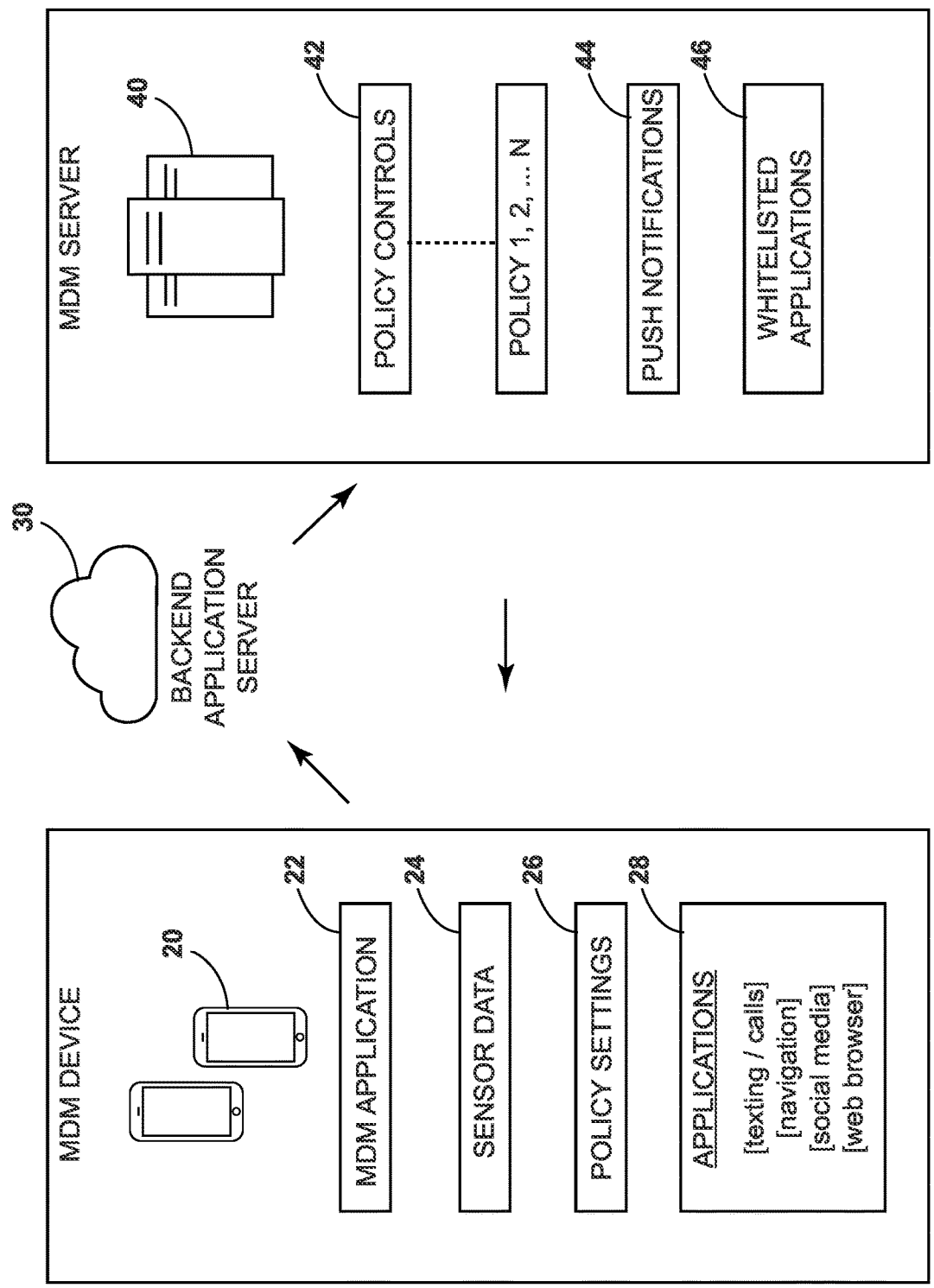
FIG. 2 is a schematic diagram of an MDM device and MDM server in connection with the flow chart of FIG. 1.

As discussed herein, the current embodiments relate to a method and a system for dynamically providing an MDM device with updated policy controls based on sensory data from the MDM device. With reference to FIG. 1, the method generally includes providing a software application for execution by the MDM device to detect a preselected state (step 10), monitoring for a preselected state (step 12), if a preselected state is detected, notifying the MDM server and pushing temporary policy controls from the MDM server to the MDM device, where the temporary policy controls overwrite existing policy controls and remove non-whitelisted application tiles from the MDM device home screen (step 14). The method further includes monitoring sensor data for the prior state (step 16), and if the prior state is detected (step 18), reverting to prior policy controls (step 19). Each step is discussed below in connection with the block diagram of FIG. 2.

Providing a software application at step 10 generally includes, for each MDM device 20, installing a software application 22 ("MDM application") for determining whether a pre-selected state is present. In the current embodiment, the MDM application 22 operates in the application layer of each MDM device 20, but can be a portion of the operating system in other embodiments. The MDM application 22 monitors certain functionality of the MDM device 20, including various sensor data 24. For example, each MDM device can include a GPS receiver, an accelerometer, a microphone, various network connectors (4G, WiFi, Bluetooth) and other components that generate data in response to a measurement. Each MDM device can also include a wired or wireless input, for example an on-board diagnostic (OBD) input, for receiving speed, mileage, or other data from a vehicle CAN bus or other external source. In addition, non-sensor data such as clock data and calendar data can also be included with sensor data 24 that is resident on the MDM device 20.

As noted above, the MDM application 22 determines whether a preselected state is present based on sensor data 24. For example, if the preselected state includes a threshold speed, the MDM application 22 is adapted to determine if the threshold speed is met based on GPS sensor data. Further by example, if the preselected sate includes motion, the MDM application 22 is adapted to determine if motion is present based on the output of the accelerometer and/or GPS sensor. By non-limiting example, a list of possible sensors, sensor data, and states are included in the Table 1 below:

TABLE 1

Sensor, Sensor Data, and State for MDM Smartphone Application

| Sensor | Sensor Data | State |
| --- | --- | --- |
| Accelerometer | Acceleration | Presence or absence of motion |
| GPS receiver | Position, velocity, altitude, timing | Geographic location, location relative to a geofenced area, speed threshold |
| Microphone | Acoustic ranging | Proximity to acoustic transmitter, location within driver space |
| Bluetooth antenna | RF sensing | Proximity to RF beacon, location within driver space |
| WiFi/cellular antenna | Network sensing | Availability of internet connectivity, strength of internet connection |
| Clock/Calendar | Date & Time | Preselected time of day/week/month or occurrence of calendared event |
| OBD input | Velocity | Speed threshold |

The foregoing table of sensors, sensor data, and states is not exhaustive and is instead provided for illustrative purposes. Other embodiments can include other sensors, sensor data, and states as desired. Referring again to FIG. 1, the MDM application 22 determines at step 12 if the predetermined state (or multiple states) is present and causes the MDM device to notify the MDM server accordingly, either directly or via a backend application server 30. For example, where the preselected state includes the presence of motion, the MDM application 22 determines, based on sensor data 24, whether the MDM device 20 is in a state of motion. Further by example, where the preselected state includes the location of the MDM device 20 relative to a geofenced area, the MDM application 22 determines, based on the sensor data 24, whether the MDM device is within the geofenced area. Still further by example, where the preselected state includes the location of an MDM device within a driver's quadrant, the MDM application 22 determines, based on acoustic data and/or RF data, whether the MDM device 20 is located within reach of the driver.

In some embodiments, sensor data from two or more sensors is required. For example, the preselected state can include whether the MDM device 20 is within the driver space while a vehicle is in motion. In this example, the backend application server 30 notifies the MDM server 40 that the preselected state is achieved only in response to accelerometer data indicating that the vehicle is in transit and in response to microphone data or Bluetooth data indicating that the mobile device is located within reach of the driver. The determination regarding whether the state is present is generally made at the MDM device 20, but in other embodiments this determination can be made at a backend application server 30 based on the transmission of sensor data from the MDM device 20.

Once the MDM device 20 determines, through operation of the MDM application 22, that that the preselected state is active, the MDM 20 device notifies the backend application server 30, which then notifies the MDM server 40. In other embodiments, the MDM device 20 notifies the MDM server 40 directly. The state determination is made periodically, for example several times per second, such that the MDM server 40 is also notified when the preselected state is no longer present. If a sufficient time period has elapsed while the preselected state is present, the MDM server 40 causes temporary policy controls 42 to be sent to the MDM device 20 at step 14. The temporary policy controls 42 overwrite existing policy settings 26 during the period in which the preselected state is met. These policy controls can be sent to the MDM device 20 via a push notification module 44, optionally over an encrypted SSL/TLS connection, such that third-parties are prevented from spoofing the MDM device 20 with malicious policy controls. The temporary policy controls 42 are generally adapted to cause the MDM device 20 to hide non-native applications and non-whitelisted applications 46 from the MDM device home screen while the preselected state is present, and optionally for a buffer period thereafter. For example, the operating system of the MDM device 20 can hide tiles or icons for denied applications 28 during the period that the temporary policy controls remain active, while simultaneously permitting the denied applications to run in the background application layer. Consequently, the end-user is prevented from operating the denied applications pursuant to dynamic policy controls as managed by the MDM server 40. At step 16, the MDM application 22 monitors sensor data 24 for the prior state. If the prior state is detected at step 18, the MDM server 40 is again notified, directly or indirectly, and the MDM application 22 receives instructions at step 19 to revert to pre-existing policy controls. At this point, the denied application tiles are again visible on the home screen of the MDM device 20, and the process repeats at step 10.

Figure 3:
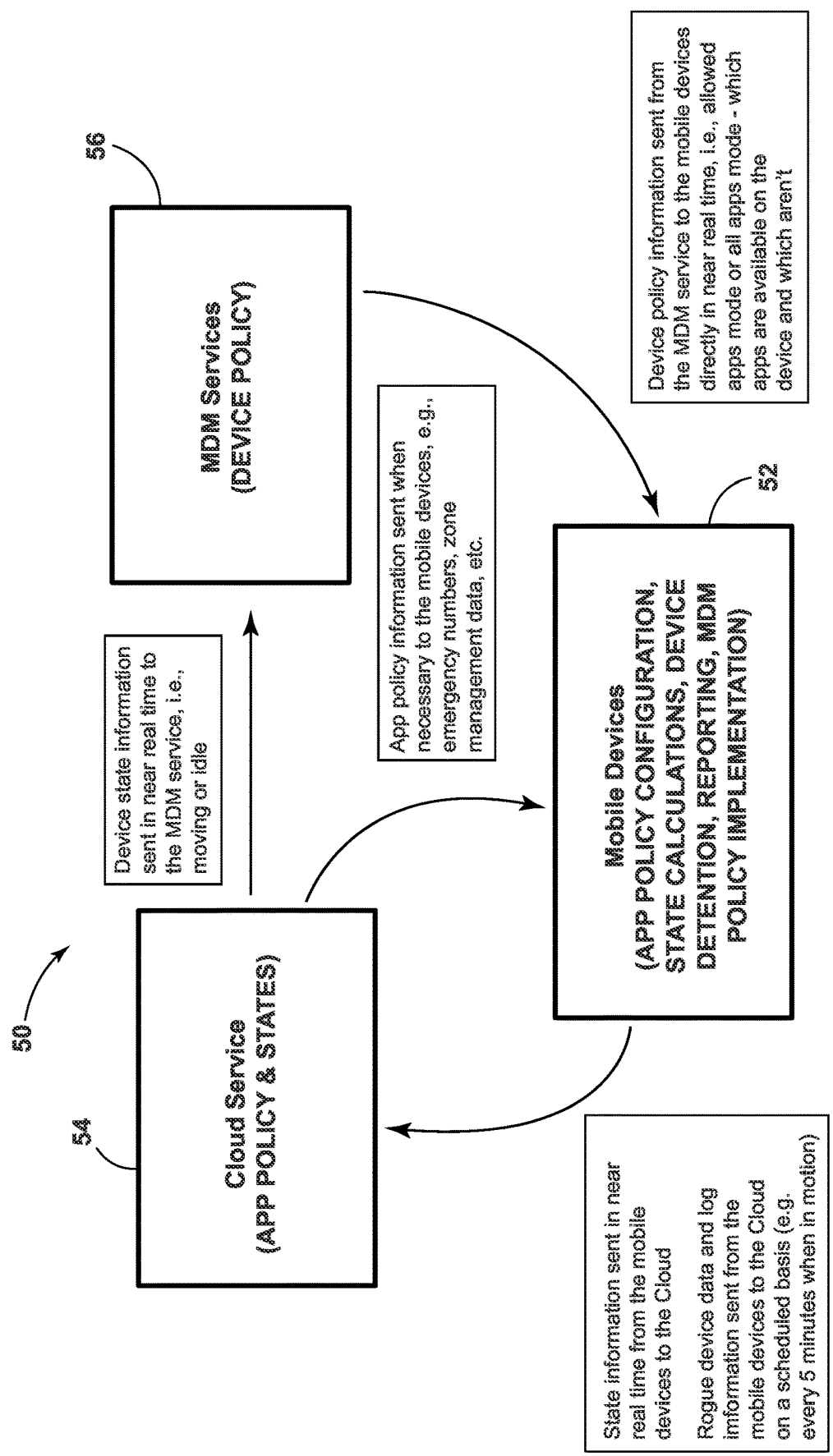
FIG. 3 is a further schematic diagram of an MDM system in accordance with one embodiment of the invention.

As noted above, the method of the present invention can be implemented across a wide range of environments, including driving environments (e.g., fleet vehicle management), commercial enterprises, educational settings, and domestic settings. Referring now to FIG. 3, a system for dynamically providing an MDM device with updated policy controls for mitigating distracted driving is illustrated and generally designated 50. In this embodiment, the MDM device 52 sends state information in real time to a backend cloud service 54. The state information can include whether a minimum speed threshold is met and/or the presence or absence or motion. Less frequently, for example every five minutes, the MDM device 52 sends rogue device information and log information to the backend cloud service. The cloud service 52 then forwards device state information in real time to the MDM service 56. The cloud service 52 also sends application policy information to the MDM device, for example policy data relating to the use of emergency numbers at any time. The MDM service 56 delivers policy information to the MDM device 52 in real time to temporarily overwrite existing policy controls to hide application tiles from the home screen while the MDM device is in transit. More specifically, the temporary policy information specifies which application tiles remain visible and which application tiles are removed from the home screen. Denied applications can include texting functions, social media, and internet browsing, for example.

To reiterate, the present invention includes dynamically providing an MDM device with updated policy controls based on sensory data from the MDM device. The updated policy controls are stored to the MDM device and override existing policy controls pursuant to push notifications from the MDM server. The present invention can be implemented in driving environments, commercial enterprises, educational settings, and domestic settings as an effective means to dynamically hide certain application tiles, such that the end-user cannot circumvent MDM controls and obtain access to denied functionality. The present invention is uniquely tailored for iOS devices, providing a robust alternative to ASAM solutions, but can be used across Android devices as well.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of wireless policy enforcement for a Mobile Device Management (MDM) system including an MDM device and an MDM server, the method comprising:
presenting, at the MDM device, a plurality of application tiles that are visible on a home screen;
providing a software application for execution by the MDM device to detect the presence of a state based on MDM device sensory data;
receiving, at the MDM server, signals indicative of the presence of the state at the MDM device, the MDM server including a temporary policy control;
pushing the temporary policy control to the MDM device to cause the MDM device to overwrite a preexisting policy control and hide a first one of the plurality of application tiles on the MDM device home screen in response to the detected state while simultaneously permitting user-access to a second one of the plurality of application tiles on the MDM device home screen, the first application tile corresponding to a non-whitelisted application, and the second application tile corresponding to a whitelisted application, wherein the non-whitelisted application operates in a background application layer of the MDM device during the temporary policy control; and
detecting the absence of the state at the MDM device and reverting to the preexisting policy control at the MDM device pursuant to a notification from the MDM server by presenting each of the first and second application tiles on the MDM device home screen,
wherein the presence of the state at the MDM device includes at least one of the following: a minimum speed of the MDM device, a geographic location of the MDM device, a location of the MDM device relative to a geofenced area, motion of the MDM device, a location of the MDM device relative to an ultrasonic beacon, a location of the MDM device relative to a radio-frequency beacon, wireless connectivity of the MDM device, or the local time at the MDM device.

2. The method of claim 1 wherein hiding the first application tile of the MDM device includes hiding at least one of a social media application tile, a text messaging application tile, and an internet browser application tile.

3. The method of claim 1 wherein the MDM device communicates state information to a backend server for forwarding to the MDM server.

4. The method of claim 1 wherein the MDM policy control is stored to the MDM device for subsequent detection of the presence of the state by the software application.

5. The method of claim 1 wherein MDM sensor data includes sensor data that is derived from a sensor that is external to the MDM device.

6. The method of claim 5 wherein the MDM sensor data is provided to the MDM device via a wired or wireless connection.

7. A system for wireless policy enforcement, the system comprising:
an MDM device including a graphical user interface comprising a home screen having a plurality of application tiles, the MDM device including at least one sensor for detecting the presence of a state at the MDM device; and
an MDM server including a temporary policy control, wherein the MDM server is adapted to receive signals indicative of the presence of the state at the MDM device and is adapted to push the temporary policy control to the MDM device to cause the MDM device to overwrite a preexisting policy control and to cause the MDM device to hide a first one of the plurality of application tiles at the MDM device home screen while simultaneously permitting user-access to a second one of the plurality of application tiles on the MDM device home screen, the first application tile corresponding to a non-whitelisted application and the second application tile corresponding to a whitelisted application, wherein the non-whitelisted application operates in a background application layer of the MDM device during the temporary policy control, wherein the MDM device reverts to the preexisting policy control in response to the MDM device no longer detecting the presence of the state at the MDM device, and wherein the preexisting policy control causes the MDM device to present each of the first and second application tiles on the MDM device home screen, wherein the presence of the state at the MDM device includes at least one of the following: a minimum speed of the MDM device, a geographic location of the MDM device, a location of the MDM device relative to a geofenced area, motion of the MDM device, a location of the MDM device relative to an ultrasonic beacon, a location of the MDM device relative to a radio-frequency beacon, wireless connectivity of the MDM device, or the local time at the MDM device.

8. The system of claim 7 wherein the MDM device further includes a software application to detect the presence of the state based on MDM device sensory data.

9. The system of claim 8 further including a backend application server to receive signals from the MDM device software application indicating the presence of the state.

10. The system of claim 9 wherein the backend application server is in electrical communication with the MDM server to notify the MDM server of the detected state.

11. The system of claim 7 wherein the first application tile includes a social media application tile, a text messaging application tile, or an internet browser application tile.

12. The system of claim 7 wherein the MDM device reverts to the preexisting policy control in response to a notification from the MDM server.

13. The system of claim 12 wherein the MDM device stores the temporary policy control to memory for subsequent activation in response to a notification from the MDM server.

* * * * *